(12) United States Patent
Narayanan

(10) Patent No.: US 9,723,499 B2
(45) Date of Patent: Aug. 1, 2017

(54) OPTIMIZER SELECTION IN WIRELESS NETWORKS

(71) Applicant: Verizon Patent and Licensing Inc., Arlington, VA (US)

(72) Inventor: Ram Gopal Lakshmi Narayanan, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 29 days.

(21) Appl. No.: 14/804,318

(22) Filed: Jul. 20, 2015

(65) Prior Publication Data

US 2017/0026855 A1 Jan. 26, 2017

(51) Int. Cl.
| | | |
|---|---|---|
| H04W 4/00 | (2009.01) | |
| H04W 24/02 | (2009.01) | |
| H04W 28/02 | (2009.01) | |
| H04W 80/06 | (2009.01) | |

(52) U.S. Cl.
CPC ....... *H04W 24/02* (2013.01); *H04W 28/0273* (2013.01); *H04W 80/06* (2013.01)

(58) Field of Classification Search
None
See application file for complete search history.

(56) References Cited

U.S. PATENT DOCUMENTS

| | | | | |
|---|---|---|---|---|
| 2010/0046511 | A1* | 2/2010 | Khalid ................. | H04L 67/141 370/389 |
| 2013/0163470 | A1* | 6/2013 | Chidambaram ...... | H04L 69/161 370/255 |

OTHER PUBLICATIONS

Jain, A. et al., "Mobile Throughput Guidance Signaling Protocol," Internet Engineering Task Force ("IETF"), available at https://tools.ietf.org/html/draft-flinck-mobile-throughput-guidance-00, Oct. 26, 2014.
Touch, J. and Eddy, W., "TCP Extended Data Offset Option," IETF, available at https://tools.ietf.org/html/draft-touch-tcpm-tcp-edo-03, Jul. 2, 2014.
Touch, J. et al., "The TCP Authentication Option," IETF, Request for Comments ("RFC") 5925, available at https://tools.ietf.org/html/rfc5925, Jun. 2010.
Heffernan, A., Protection of BGP Sessions via the TCP MD5 Signature Option, IETF, RFC 2385, available at https://tools.ietf.org/html/rfc2385, Aug. 1998.

(Continued)

*Primary Examiner* — Minh-Trang Nguyen

(57) ABSTRACT

Network service providers often make use of traffic optimizers, in order to balance the objectives of maximizing users' quality of experience ("QoE") with the costs of transmitting data. Certain content providers may make use of their own optimization algorithms, which may be interfered with by network providers' traffic optimizers. As described herein, a master optimization controller ("MOC") may be able to enable or disable traffic optimizers within a network by enhancing a Transmission Control Protocol ("TCP") three-way handshake procedure. The MOC may also perform traffic optimization, thus serving as the only device that performs optimization on traffic. Additionally, while traffic optimizers within a network are typically not visible to third party content providers, the MOC may perform optimization in a manner that may be visible to, and controlled by, a content provider.

20 Claims, 10 Drawing Sheets

(56) References Cited

OTHER PUBLICATIONS

Lebovitz, G. and Rescorla, E., "Cryptographic Algorithms for the TCP Authentication Option (TCP-AO)," IETF, RFC 5926, Jun. 2010.

Touch, J., "A TCP Authentication Option Extension for Payload Encryption," IETF, available at https://tools.ietf.org/html/draft-touch-tcp-ao-encrypt-02, Nov. 12, 2014.

\* cited by examiner

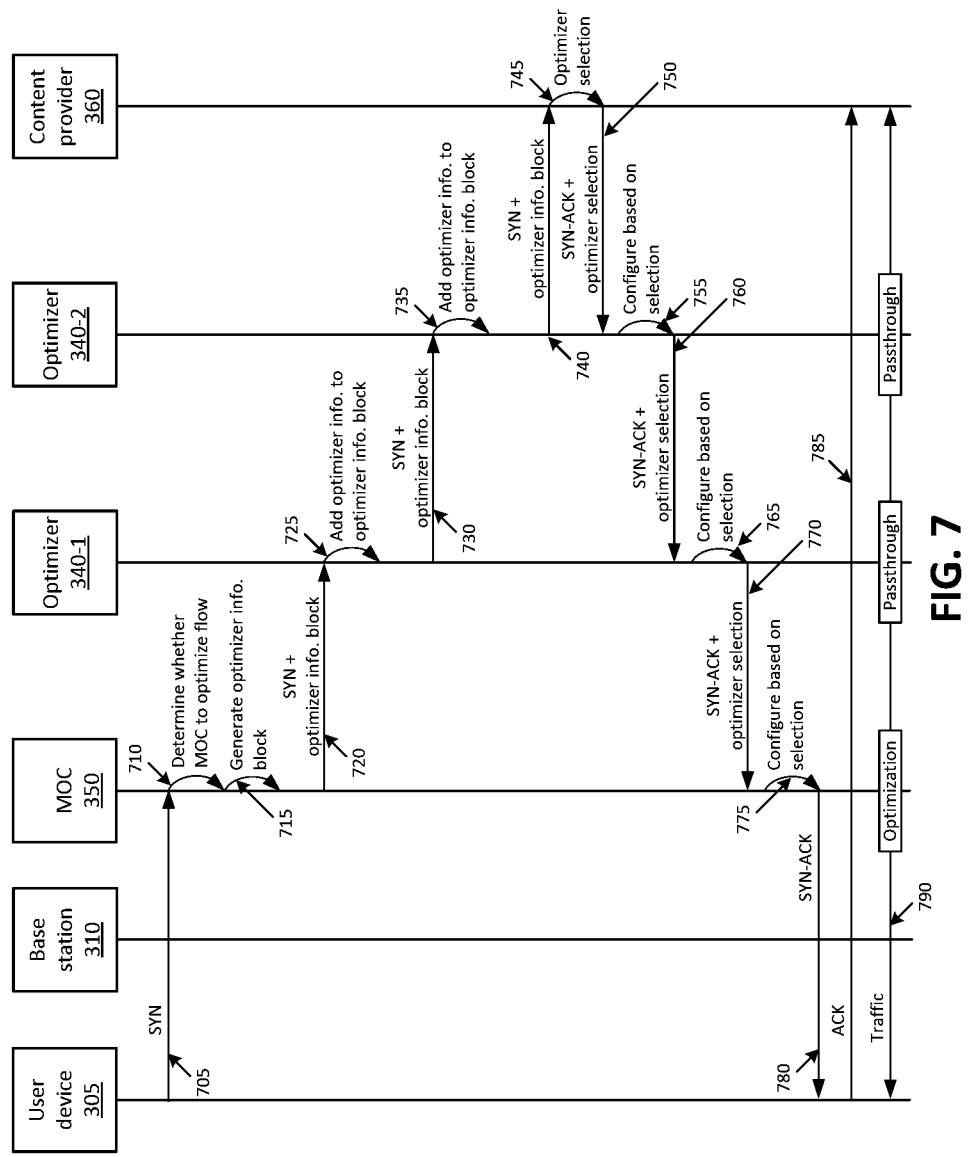

800 →

| Index | Optimizer ID | Sec./auth. information |
|---|---|---|
| 0 | 1.1.1.1:1111 | <Sec./auth. information> |
| 1 | 2.2.2.2:2222 | <Sec./auth. information> |
| 2 | 3.3.3.3:3333 | <Sec./auth. information> |

Added by MOC 350 → (row 0)
Added by optimizer 340-1 → (row 1)
Added by optimizer 340-2 → (row 2)

| Index | Optimizer ID | Sec./auth. information |
|---|---|---|
| 0 | 1.1.1.1:1111 | <Sec./auth. information> |

| Index | Optimizer ID | Enable/disable | Sec./auth. information |
|---|---|---|---|
| 0 | 1.1.1.1:1111 | 1 | <Sec./auth. information> |
| 1 | 2.2.2.2:2222 | 0 | <Sec./auth. information> |
| 2 | 3.3.3.3:3333 | 0 | <Sec./auth. information> |

FIG. 10

OPTIMIZER SELECTION IN WIRELESS NETWORKS

BACKGROUND

In an increasingly networked world, the amount of data consumed by users is increasing at a drastic rate. Furthermore, the demand for high quality content delivery is increasing. For example, users may expect high quality streaming video content to be readily available. In order to balance a high quality of experience with cost of delivery, content providers (e.g., websites and/or other services that provide content) may make use of flow processing techniques, such as caching, transcoding, using certain streaming algorithms, and/or other techniques.

Network providers, such as providers of wireless networks via which content is delivered, may also employ flow processing. In some instances, the flow processing, used by the network providers, may be at odds with the flow processing used the by content providers—sometimes even to the extent that more harm is done to the user experience than good.

BRIEF DESCRIPTION OF THE DRAWINGS

FIG. 7 illustrates an example signal flow for selecting and/or electing one or more optimizers, in accordance with some implementations;

FIGS. 8-10 illustrate examples of data that may be used in selecting and/or electing one or more optimizers, in accordance with some implementations;

DETAILED DESCRIPTION OF PREFERRED EMBODIMENTS

The following detailed description refers to the accompanying drawings. The same reference numbers in different drawings may identify the same or similar elements.

Figure 1:
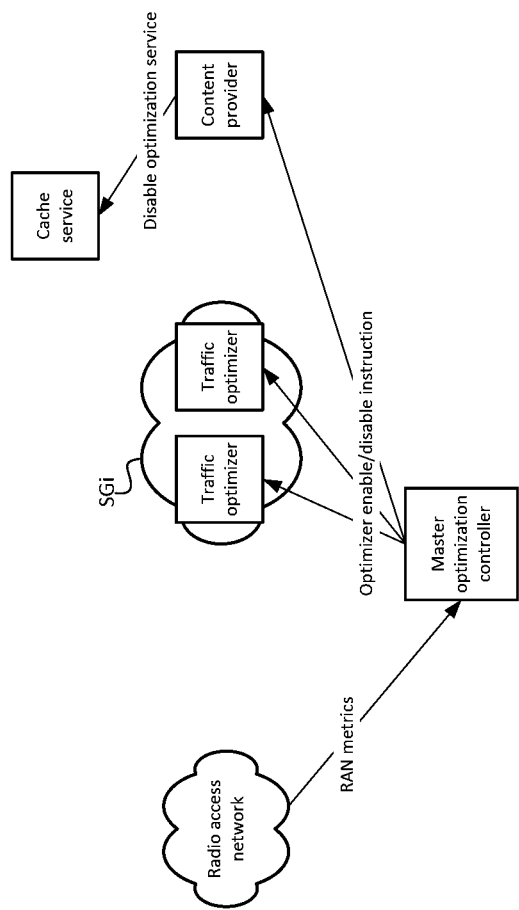
FIGS. 1 and 2 illustrate an example overview of one or more implementations described herein.

Systems and/or methods, described herein, may allow for the centralized control of optimizers within a network, such that the optimizers do not compete with each other and/or with flow processing techniques used by a content provider. For example, as shown in FIG. 1, a master optimization controller ("MOC") may be in communication with a radio access network ("RAN") of a wireless telecommunication network, a set of traffic optimizers associated with the wireless telecommunication network, and a content provider (e.g., a web server). In some implementations, the MOC may be deployed peripheral to the RAN (e.g., may be located logically between the RAN and a core network of the wireless telecommunications network). The traffic optimizers may be part of an SGi (or SGi-Local Area Network ("LAN")) portion of the wireless telecommunication network, which may serve as an egress point between a core of the wireless network and an external network (e.g., the Internet).

As shown, the MOC may be configured to provide instructions, to the optimizers and/or to the content provider, which may indicate whether the respective traffic optimizers and/or content provider should perform flow processing on traffic. For example, as described below, the MOC may instruct the content provider not to perform flow processing (e.g., not to use an external caching service associated with the content provider) for traffic sent to and/or received via the network or from a particular user device. As another example, the MOC may instruct particular traffic optimizers not to perform flow processing for traffic sent to and/or received via the network or from a particular user device. As yet another example, the MOC may instruct one or more traffic optimizers to perform flow processing on traffic sent to and/or received via the network or the particular user device, while instructing one or more other traffic optimizers not to perform flow processing on the traffic.

Figure 2:
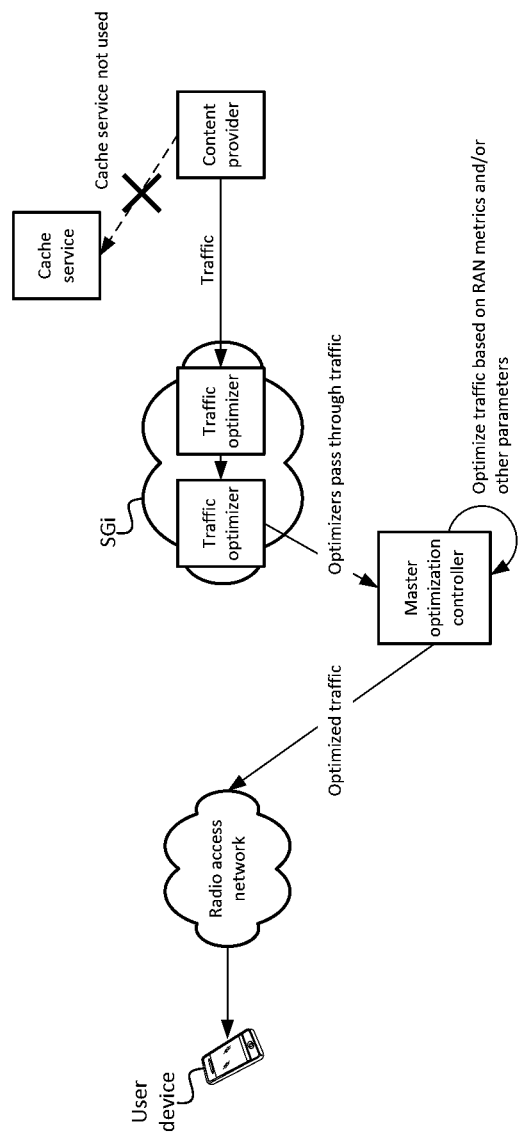

As further shown, the MOC may receive RAN metrics, which may indicate, for example, how loaded the RAN is, an uplink and/or downlink bandwidth associated with the RAN, a latency associated with the RAN, and/or other metrics that indicate the RAN's performance and/or availability. The RAN metrics may be used, in some implementations, by the MOC, such as when the MOC performs flow processing on traffic. For instance, as shown in FIG. 2, assume that the content provider outputs traffic toward a user device. Based on the instruction, received in FIG. 1 from the MOC, the content provider may forgo using a caching service that the content provider ordinarily uses when outputting content.

As further shown, the traffic optimizers, which may be in a signal path of the traffic, and which ordinarily would perform flow processing on the traffic, may forgo performing flow processing, and allow the traffic to pass through the traffic optimizers. The traffic may be received by the MOC, which may perform flow processing in accordance with a configuration that may be determined by an operator of the network (e.g., based on a service level agreement ("SLA") made with the content provider). For example, assuming that the content is video content, the MOC may "optimize" the traffic by performing transcoding, down sampling, and/or some other optimization or processing function. When optimizing the traffic, the MOC may make use of the RAN metrics and/or other considerations, in order to balance users' quality of experience with cost of data transmission, network load, etc.

Figure 3:
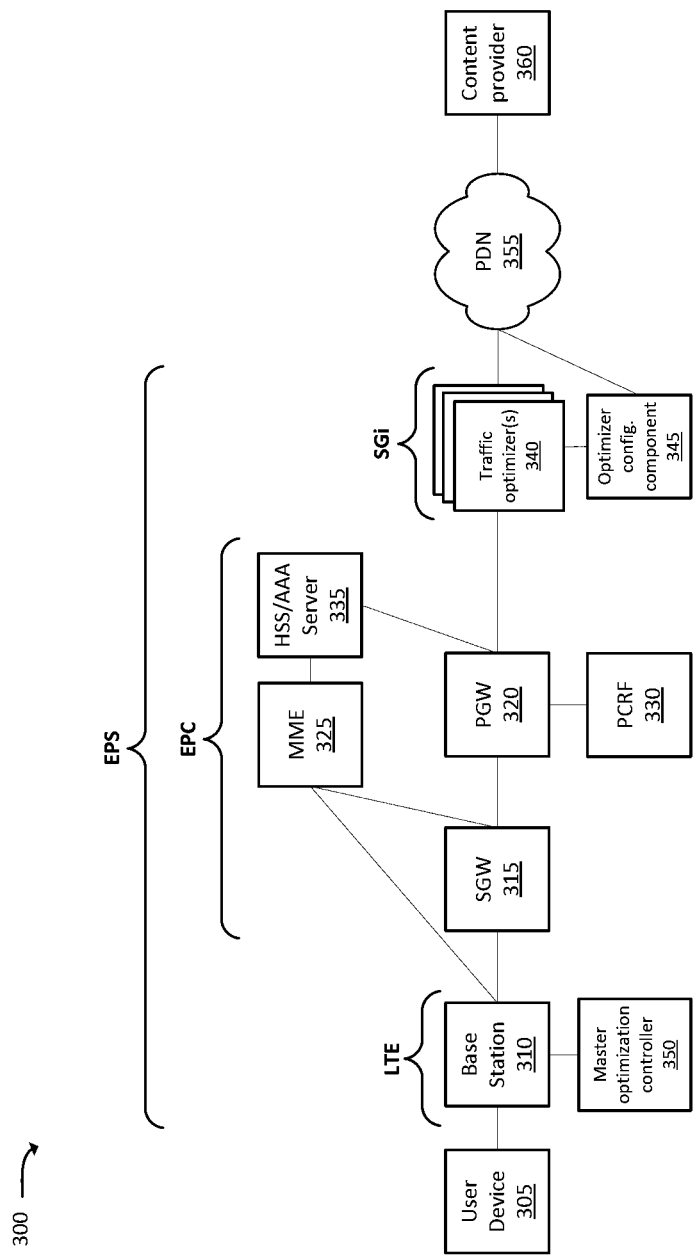
FIG. 3 illustrates an example environment, in which systems and/or methods, described herein, may be implemented.

FIG. 3 illustrates example environment 300, respectively, in which systems and/or methods described herein may be implemented. As shown in FIG. 3, environment 300 may include user device 305, base station 310, serving gateway ("SGW") 315, packet data network ("PDN") gateway ("PGW") 320, mobility management entity device ("MME") 325, policy and charging rules function ("PCRF") 330, home subscriber server ("HSS")/authentication, authorization, accounting ("AAA") server 335 (hereinafter referred to as "HSS/AAA server 335"), one or more traffic optimizers 340, optimizer configuration component ("OCC") 345, MOC 350, PDN 355, and content provider 360. While "direct" connections are shown in FIG. 3 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIG.

3 may be logical connections, and may represent the communication between different logical portions of a single device.

Environment 300 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 310, some or all of which may take the form of an evolved node B ("eNB"), via which user device 305 may communicate with the EPC network. The EPC network may include one or more SGWs 315, PGWs 320, and/or MMEs 325, and may enable user device 305 to communicate with PDN 355 and/or an Internet protocol ("IP") multimedia subsystem ("IMS") core network. The IMS core network may include and/or communicate with HSS/AAA server 335, and may manage authentication, session initiation, account information, a user profile, etc., associated with user device 305. The EPS may include an SGi component (e.g., an SGi LAN), which may serve as the egress point between the EPS and PDN 355. The SGi LAN may include one or more traffic optimizers 340.

User device 305 may include a computation and communication device, such as a wireless mobile communication device that is capable of communicating with base station 310, femtocell 315, and/or PDN 355. For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 305 may send traffic to and/or receive traffic from PDN 355 via base station 310, SGW 315, PGW 320, traffic optimizer(s) 340, and/or MOC 350.

Base station 310 may include one or more network devices that receive, process, and/or transmit traffic, such as calls, audio, video, text, and/or other data, destined for and/or received from user device 305. In one example, base station 310 may be an eNB device and may be part of the LTE network. Base station 310 may receive traffic from and/or send traffic to user device 305 via SGW 315, PGW 320, and/or PDN 355. Base station 310 may send traffic to and/or receive traffic from user device 305 via, for example, an air interface (e.g., a cellular air interface). In some implementations, base station 310 may be communicatively coupled to MOC 350, and may provide metrics relating to the operation of the LTE network to MOC 350.

SGW 315 may include one or more network devices that gather, process, search, store, and/or provide information in a manner described herein. SGW 315 may, for example, aggregate traffic received from one or more base stations 310 and/or MOC 350, and may send the aggregated traffic to PDN 355 via PGW 320.

PGW 320 may include one or more network devices that gather, process, search, store, and/or provide information in a manner described herein. PGW 320 may aggregate traffic received from one or more SGWs 315, etc. and may send the aggregated traffic to PDN 355 (e.g., via traffic optimizer(s) 340). PGW 320 may also, or alternatively, receive traffic from PDN 355 and may send the traffic toward user device 305 via base station 310, SGW 315, traffic optimizer(s) 340, and/or MOC 350.

MME 325 may include one or more computation and communication devices that perform operations to register user device 305 with the EPS, to establish bearer channels associated with a session with user device 305, to hand off user device 305 from the EPS to another network, to hand off user device 305 from the other network to the EPS, and/or to perform other operations. MME 325 may perform policing operations on traffic destined for and/or received from user device 305.

PCRF 330 may include one or more devices that aggregate information to and from the EPC network and/or other sources. PCRF 330 may receive information regarding policies and/or subscriptions from one or more sources, such as subscriber databases and/or from one or more users (such as, for example, an administrator associated with PCRF 330).

HSS/AAA server 335 may include one or more devices that manage, update, and/or store, in a memory associated with HSS/AAA server 335, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 305); information regarding services to which particular subscribers are subscribed (e.g., communication services, such as video conferencing services, voice chat services, etc.); and/or other information. Additionally, or alternatively, HSS/AAA server 335 may perform authentication, authorization, and/or accounting operations associated with the subscriber and/or a communication session with user device 305.

Traffic optimizer(s) 340 may include one or more network devices, in a signal path between user device 305 and content provider 360, that may perform various optimization and/or flow processing functions with the general goals of enhance users' quality of experience and/or minimizing cost of data transmission. For example, a particular optimizer 340 may receive streaming video content from content provider 360, and deliver the video content to user device 305 in bursts (e.g., in a different manner than that received from content provider 360). As another example, optimizer 340 may receive streaming video content from content provider 360, and may transcode the video content from one codec to another. As yet another example, optimizer 340 may cache content from content provider 360, and provide the cached content to user device 305. As still another example, optimizer 340 may throttle a connection between user device 305 and content provider 360 based on how much data has been consumed by user device 305 and/or content provider 360. While these are some examples of types of optimization and/or flow processing functions that may be performed by optimizer 340, in practice, other types of optimization and/or flow processing functions may be performed, on traffic to and/or from user device 305 and/or user device 305, by optimizer 340.

Traffic optimizer(s) 340 may, in some implementations, be a part of a 3GPP SGi portion of a telecommunications network. Examples of the types of functionality provided by traffic optimizer(s) 340 may include a firewall, a network address translation ("NAT") function, a video optimization function, a web optimization function, a security gateway function, a Transmission Control Protocol ("TCP") optimization function, etc.

Generally speaking, optimizer 340 may be logically located at an ingress/egress point of the EPS, and traffic (e.g., user plane data) may flow between the EPS and PDN 355 through traffic optimizer(s) 340. Traffic optimizers 340 may have "private" IP addresses, in the sense that user device 305 and/or content provider 360 cannot specify the IP addresses of traffic optimizers 340 when sending and/or receiving traffic. Instead, the EPS may be configured such that only particular devices within the EPS may directly address traffic optimizers 340. Thus, when sending and/or receiving traffic, user device 305 and/or content provider 360 may typically do so without having the knowledge of which traffic optimizers 340, if any, are performing flow processing and/or optimization functions on the traffic. Additionally, in some implementations, one optimizer 340 may perform flow processing and/or optimization without knowledge of other traffic optimizers 340. Because of this lack of knowledge, the optimization or flow processing efforts of senders or receivers of traffic (e.g., user device 305 and content provider 360), or even of other traffic optimizers 340, may be hindered or negatively impacted by the optimization and/or flow processing functionality of one or more traffic optimizers 340 (e.g., in cases where different or opposing objectives are attempted to be achieved by different traffic optimizers 340, user device 305, or content provider 360).

OCC 345 may include one or more devices that configure and/or maintain information regarding traffic optimizer(s) 340. For example, OCC 345 may maintain identifying information for the traffic optimizer(s) 340, such as a private IP address, and/or a publicly available identifier (e.g., a device name, a hash of the private IP address, and/or some other identifier). OCC 345 may also maintain information that indicates what types of optimization and/or flow processing functions are performed by one or more of the traffic optimizers 340. As described further below, this information may be used when controlling the operation of traffic optimizers 340, such as the selection of which (if any) of traffic optimizers 340 should continue to perform optimization and/or flow processing, and/or the selection of which (if any) of traffic optimizers 340 should pass through traffic without performing optimization and/or flow processing functions.

In some implementations, OCC 345 may provide domain name server ("DNS") services. For example, as described below, OCC 345 may resolve resource identifiers, such as Uniform Resource Locators ("URLs") into IP addresses. In some implementations, OCC 345 may be communicatively coupled to an external device or service that provides DNS services.

MOC 350 may include one or more devices that control the operation of one or more traffic optimizers 340, in accordance with some implementations described herein. In some implementations, MOC 350 may be communicatively coupled to, and/or may be implemented as part of (e.g., as hardware circuitry and/or software logic) base station 310. In some implementations, MOC 350 may perform one or more optimization and/or flow processing functions on traffic sent between user device 305 and content provider 360. MOC 350 may, in some implementations, receive RAN metrics (e.g., performance and/or load information associated with a RAN implemented by base station 310), and may perform the optimization and/or flow processing functions based on the RAN metrics.

PDN 355 may include one or more wired and/or wireless networks. For example, PDN 355 may include an IP-based PDN, a wide area network ("WAN") such as the Internet, a core network of a telecommunications provider, a private enterprise network, and/or one or more other networks. User device 305 may connect, through PGW 320, to data servers, application servers, other user devices 305, and/or to other servers or applications that are coupled to PDN 355. PDN 355 may be connected to one or more other networks, such as a public switched telephone network ("PSTN"), a public land mobile network ("PLMN"), and/or another network.

Content provider 360 may include one or more server devices that provide content (e.g., streaming content, such as streaming audio and/or video content) to user device 305. As mentioned above, content provider 360 may communicate with user device 305 via PDN 355, and traffic sent between content provider 360 and user device 305 may traverse one or more intermediary devices, including traffic optimizers 340 and MOC 350. In some implementations, content provider 360 may also perform optimization and/or flow processing functions on traffic intended for user device 305. For example, content provider 360 may output portions (or "chunks") of a particular item of streaming video content, based on ongoing requests from user device 305 (e.g., using a Hypertext Transfer Protocol ("HTTP") Live Streaming ("HLS") technique, a Moving Pictures Experts Group ("MPEG") Dynamic Adaptive Streaming over HTTP ("DASH") technique, or another streaming technique). As mentioned above, the content output techniques, utilized by content provider 360, may sometimes be interfered with by the operation of one or more traffic optimizers 340, and traffic optimizers 340 may thus be viewed as undesirable, in terms of the operation of content provider 360. In some implementations, content provider 360 may communicate (e.g., via PDN 355) with one or more other devices or services (not pictured), such as a third party caching or optimization service.

Figure 4:
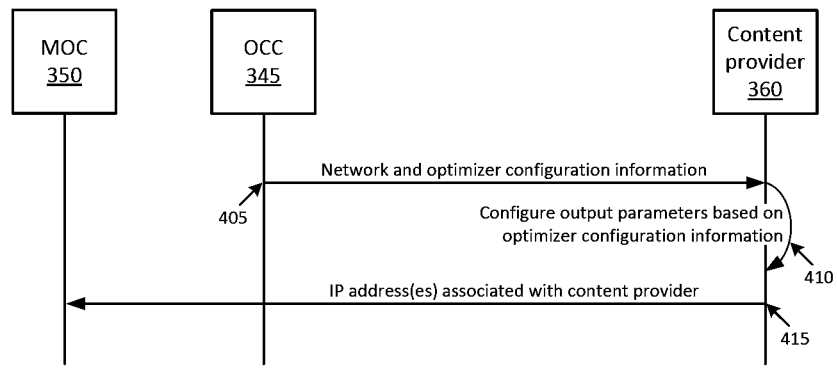
FIGS. 4-6 illustrate example signal flows for configuring an optimizer selection/election mechanism, in accordance with some implementations.
Figure 5:
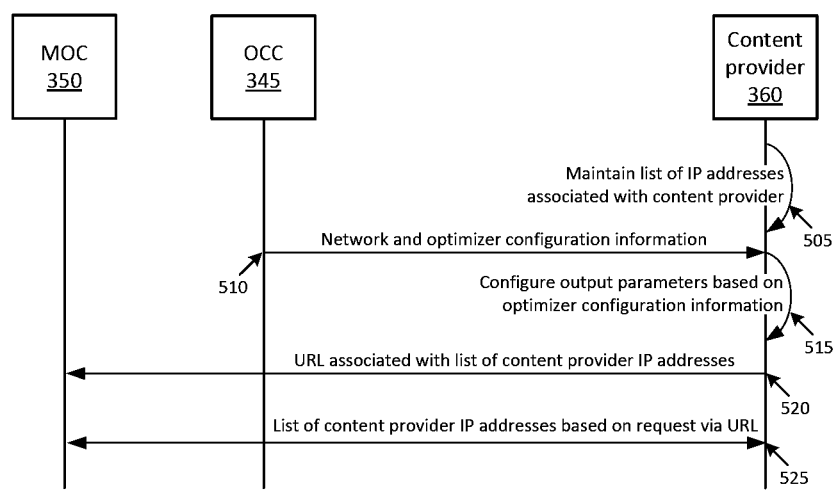
Figure 6:
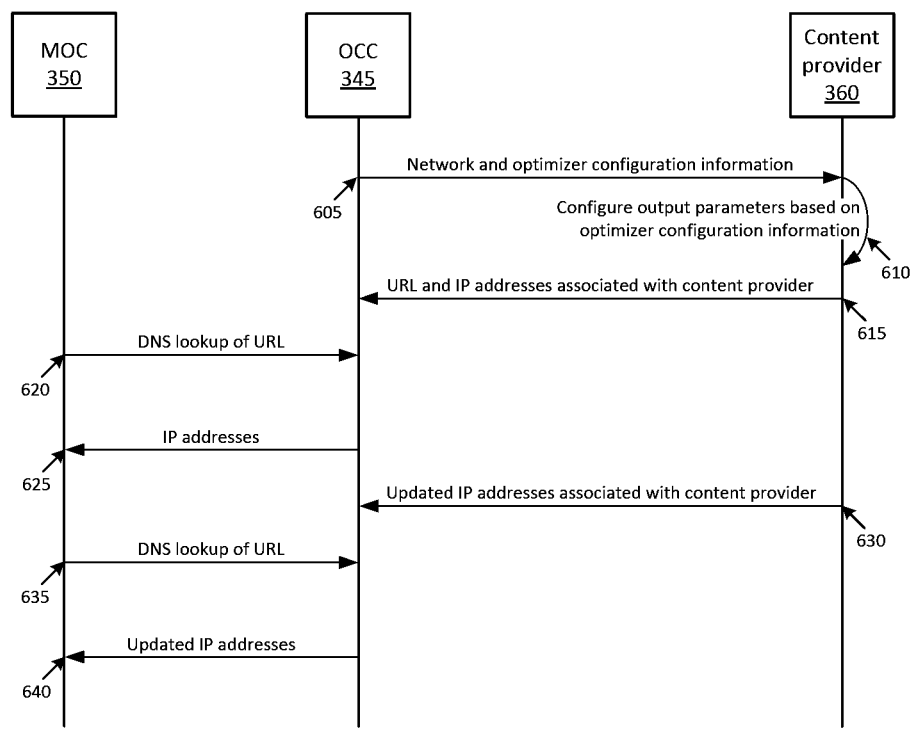

FIGS. 4-6 illustrate example signal flows for configuring an optimizer selection/election mechanism, in accordance with some implementations. The configuration, shown in these figures, may serve to provide information to MOC 350 and/or content provider 360, which MOC 350 and/or content provider 360 can subsequently use to enable or disable the functionality of, or to otherwise configure, one or more traffic optimizers 340.

Referring to FIG. 4, OCC 345 may provide (at 405) network and optimizer configuration information to content provider 360. The network information may include, for example, one or more IP addresses (e.g., "public" IP addresses) associated with one or more devices (e.g., a device that corresponds to an ingress point and/or an egress point) associated with a wireless telecommunication network (e.g., a wireless telecommunication network that includes the EPS shown in FIG. 3, and/or that is associated with traffic optimizers 340). As described below, content provider 360 may use the IP address information to identify traffic that is being sent to and/or received from the network (e.g., traffic that has traversed, or will travers, one or more traffic optimizers 340), and may treat such traffic differently than traffic that does not traverse the particular network.

The optimizer configuration information may also include information regarding traffic optimizers 340 in the network, through which traffic sent and/or received by content provider 360 would traverse. As mentioned above, this information may identify types of optimization and/or flow processing that traffic optimizers 340 are configured to perform.

OCC 345 may also provide (at 405) information regarding MOC 350, such as an IP address (e.g., a public IP address) associated with MOC 350. OCC 345 may also provide an indication, that MOC 350 is present in the network and is available to control the operation of one or more traffic optimizers 340.

The information, provided by OCC 345, may be provided as part of a registration, or "handshake," process (e.g., a TCP three-way handshake). For example, an operator of content provider 360 may have established one or more SLAs with an operator of the telecommunications network, whereby one or more traffic optimizers 340 may be enabled or disabled. As part of this SLA, content provider 360 may register with the network, in order to enable the functionality described herein, in accordance with some implementations.

Content provider 360 may configure (at 410) content output parameters based on the received information. For example, content provider 360 may determine how best to output traffic (e.g., streaming traffic) in a manner that accounts for the types of optimization and/or flow processing that would be performed on the traffic by traffic optimizers 340. Additionally, or alternatively, content provider 360 may determine which (if any) traffic optimizers 340 should be "disabled" (e.g., which traffic optimizers 340 should simply pass through traffic, associated with content provider 360, instead of performing optimization and/or flow processing functions).

Content provider 360 may provide (at 415) information regarding one or more IP addresses, associated with content provider 360, to MOC 350. For example, content provider 360 may use the public IP address information, provided at 405, to contact MOC 350. As described below, MOC 350 may identify traffic, sent to and/or from content provider 360, based on a source and/or destination IP address of traffic matching an IP address associated with content provider 360, and may optimize and/or process the traffic sent to and/or from content provider 360.

The signal flow shown in FIG. 4 may be useful in implementations where the IP address (or addresses), associated with content provider 360, are static IP addresses, which are not expected to change. The signal flows shown in FIGS. 5 and 6 may be useful in implementations where the IP address (or addresses), associated with content provider 360, are dynamic IP addresses, which may change over time.

Referring to FIG. 5, content provider 360 may maintain (at 505) a list of IP addresses associated with content provider 360. For example, content provider 360 may store the list in a manner in which the list can be subsequently accessed by another device, such as MOC 350, via a resource locator (such as a URL, an IP address, etc.). In one example implementation, the list may be stored at a web page. In some implementations, the list of IP addresses may be obtained only by authorized devices, and may be associated with authentication credentials (e.g., encryption key, user names and password, etc.) in order to prevent the unauthorized access of the list of IP addresses.

Similar to signals 405 and 410 described above with respect to FIG. 4, OCC 345 may provide (at 510) network and optimizer configuration information to content provider 360, and content provider 360 may configure (at 515) output parameters based on the received configuration information. Content provider 360 may output (at 520) a resource locator (e.g., a URL), associated with the list of IP addresses of content provider 360, to MOC 350. In some implementations, content provider 360 may also provide authentication credentials, which may allow MOC 350 to access the list of IP addresses.

MOC 350 may obtain (at 525) the list of IP addresses associated with content provider 360. For example, MOC 350 may use the URL, associated with the list, provided at 520. In some implementations, MOC 350 may use authentication credentials when obtaining the list of IP addresses. In some implementations, MOC 350 may obtain the list of IP addresses, using the URL, on a periodic or intermittent basis. For example, MOC 350 may request the list of IP addresses every 24 hours, every week, and/or on another regular or periodic basis. In some implementations, MOC 350 may request the list of IP addresses based on the occurrence of one or more events. For example, MOC 350 may request the list of IP addresses upon receiving (at 520) the URL associated with the list. As another example, MOC 350 may request the list of IP addresses when receiving traffic that does not match an IP address of a known content provider 360.

Referring to FIG. 6, OCC 345 may provide (at 605) network and optimizer configuration information to content provider 360, and content provider 360 may configure (at 610) output parameters based on the received configuration information. Content provider 360 may output (at 615) a resource locator, such as a URL, associated with content provider 360, to OCC 345. Content provider 360 may also provide a list of IP addresses, associated with content provider 360 (e.g., associated with the URL), to OCC 345. OCC 345 may store the URL and the IP addresses, in order to perform DNS services. For example, when OCC 345 receives a communication that specifies the destination as the URL, OCC 345 may resolve the URL by identifying one or more of the IP addresses associated with the URL. In some implementations, instead of performing DNS services, another device may provide DNS services. In some such implementations, OCC 345 may provide the URL and the IP addresses to the external device that provides DNS services.

MOC may perform (at 620) a DNS lookup of the URL. For example, MOC 350 may make an explicit request, to OCC 345, for the IP address(es) associated with the URL. In some implementations, MOC 350 may perform the DNS on a periodic and/or intermittent basis, based on the occurrence of one or more events, and/or based on the satisfaction of one or more criteria.

In some implementations, OCC 345 may retrieve the IP address(es) from a local memory device associated with OCC 345, and/or from some external device, and may output (at 625) the IP address(es), associated with the URL (and thus, associated with content provider 360), to MOC 350.

At some point, the IP address configuration of content provider 360 may change, and content provider 360 may be associated with a different set of IP addresses. When the IP addresses change, content provider 360 may provide (at 630) the updated IP address to OCC 345. At some subsequent time, MOC 350 may perform (at 635) another DNS lookup. Based on this subsequent DNS lookup, OCC 345 may provide (at 640) the updated IP addresses to MOC 350.

Figure 11:
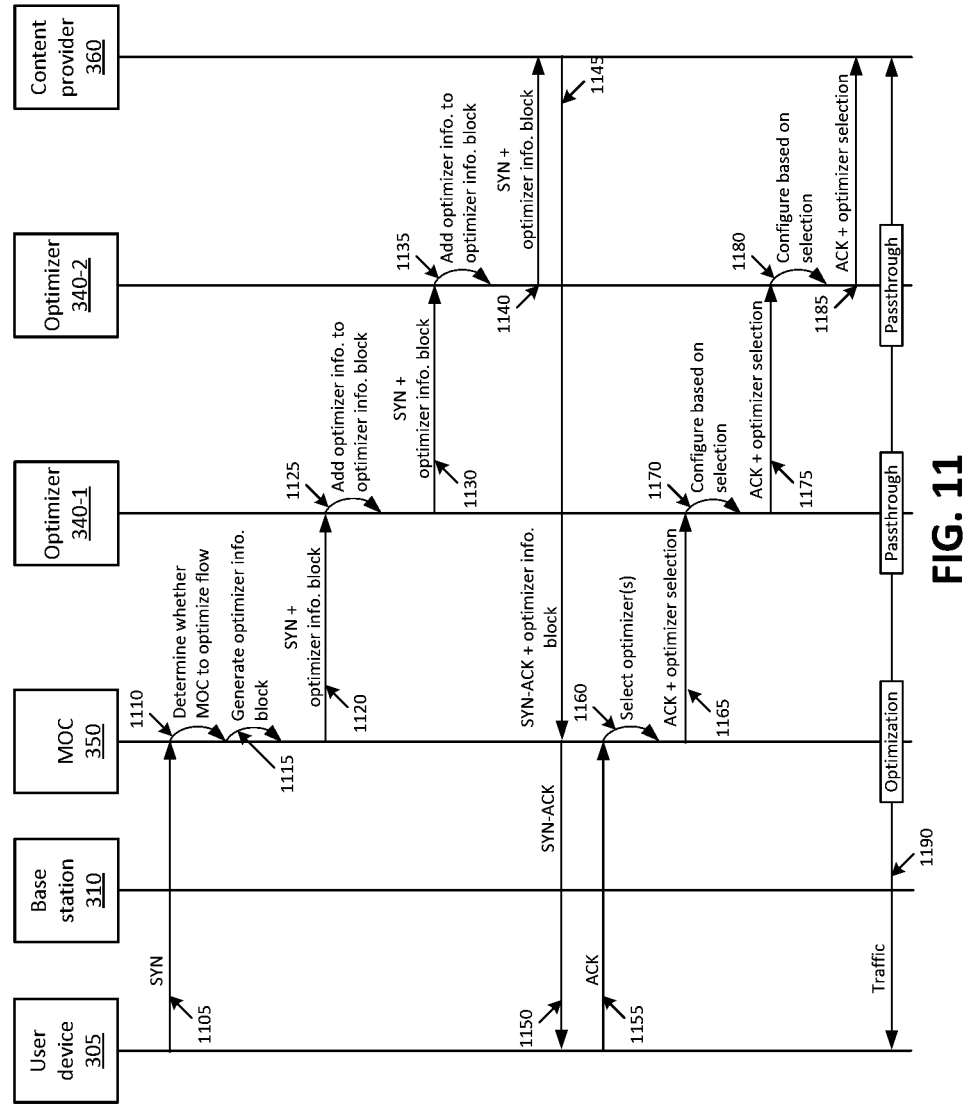
FIGS. 11 and 12 also illustrate example signal flows for selecting and/or electing one or more optimizers, in accordance with some implementations.
Figure 12:
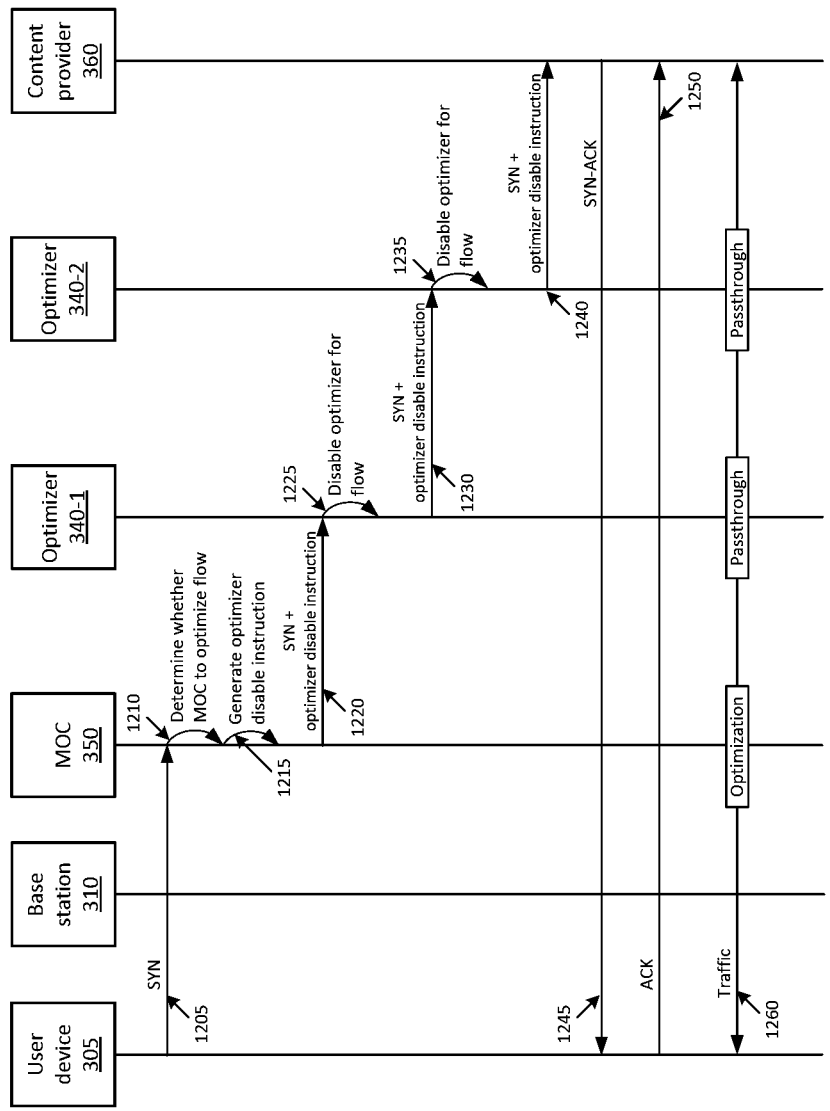

Once MOC 350 is configured to recognize traffic associated with content provider 360 (e.g., according to the example signal flows shown in FIG. 4, 5, or 6, and/or a similar type of configuration process), one or more traffic optimizers 340 may be configured (e.g., to either perform optimization and/or flow processing, or to pass through traffic). FIGS. 7, 11, and 12 illustrate example signal flows that relate to the configuration of one or more traffic optimizers.

Referring to FIG. 7, user device 305 may output a TCP synchronize ("SYN") message, as part of a handshake process with content provider 360. For example, the handshake process may be part of an initial request, by user device 305, for content provided by content provider 360. As shown, MOC 350 may receive the SYN message via base station 310.

MOC 350 may determine (at 710) whether MOC 350 should optimize a data flow between user device 305 and content provider 360 (e.g., whether MOC 350 should instruct one or more traffic optimizers 340 to provide, or forgo providing, optimization and/or flow processing functions). For instance, MOC 350 may compare a destination IP address, associated with the SYN message, to a list of IP addresses associated with one or more content providers (which may have been received as part of the configuration shown in, for example, FIGS. 4-6). Assume, for the sake of this example, that the destination IP address, associated with the SYN message, matches an IP address of the particular content provider 360 shown in this figure.

Based on determining that MOC 350 should optimize the data flow between user device 305 and content provider 360, MOC 350 may generate (at 715) an optimizer information block. Generally, the optimizer information block may be used to collect information regarding optimizers 340, that are in the signal path between user device 305 and content provider 360. An example of an optimizer information block 800 is shown in FIG. 8. As shown in FIG. 8, optimizer information block 800 may include a group of fields (illustrated here as columns) for each of a group of records (illustrated here as rows). Each record may correspond to one particular optimizer 340, and/or to MOC 350. For example, the first (top-most) record, in example optimizer information block 800, may include information associated with MOC 350, the second record may include information associated with a first optimizer (e.g., optimizer 340-1), and the third record may include information associated with a second optimizer (e.g., optimizer 340-2). As described further below, the information for a particular device may be added (e.g., appended) to optimizer information block 800 when the particular device receives optimizer information block 800.

The information, for a particular device, may include an index, an identifier of the particular device ("Optimizer ID"), and security and/or authorization information. The index may be a field that indicates an order in which traffic traverses the particular device. For example, referring briefly back to FIG. 7, the first device, through which optimizer information block 800 traverses, is MOC 350, followed by optimizer 340-1 and optimizer 340-2. The Optimizer ID field may store an IP address (e.g., a private IP address) and/or some other type of identifier (e.g., a hash of the private IP address, a media access control ("MAC") address, a unique device name, and/or some other value), based on which a particular optimizer and/or MOC 350 may use to identify traffic or instructions intended for itself. The security and/or authorization information may include information, based on which a particular device may use or provide, in order to be authorized to receive some or all of the information described herein (e.g., instructions relating to whether to perform flow processing or not, identifying information for other optimizers 240, etc.).

Referring back to FIG. 7, the optimizer information block (generated at 715) may include information regarding MOC 350 (e.g., an IP address and/or some other identifier of MOC 350). For example, FIG. 9 illustrates an example optimizer information block 900, as generated by MOC 350. That is, the optimizer information block 900, generated by MOC 350, may only include information relating to MOC 350. In some implementations, optimizer information block 900 may have security and/or authentication information, which may be used by optimizers 340 and/or content provider 360 to verify the identity of MOC 350. In some implementations, the optimizer information block may be appended to the same packet as the SYN message (e.g., within header and/or payload information of the packet). In other implementations, the optimizer information block may be sent in a separate packet (or set of packets).

Returning to FIG. 7, MOC 350 may forward (at 720) the SYN message and the optimizer information block to content provider 360 (e.g., based on the destination IP address, specified by user device 305). The SYN message and the optimizer information block may be received by a set of traffic optimizers 340 (i.e., optimizer 340-1 and 340-2, in this example), which may be in a signal path between user device 305 and content provider 360.

When received by optimizer 340-1, optimizer 340-1 may add (at 725) information regarding optimizer 340-1 to the optimizer information block. For instance, referring back to FIG. 8, the information in the second record (i.e., the record having the index of "2") may be added by optimizer 340-1. In some implementations, optimizer 340-1 may authenticate the optimizer information block (e.g., based on security and/or authentication information, added by MOC 350), in order to verify whether the optimizer information block should be treated as trustworthy information. Optimizer 340-1 may forward (at 730) the SYN message and the optimizer information block (including the information added by optimizer 340-1) toward content provider 360.

As mentioned above, optimizer 340-2 may receive the SYN message and the optimizer information block. Similar to the above acts described with regard to optimizer 340-1, optimizer 340-2 may add (at 735) information regarding optimizer 340-2 to the optimizer information block. Optimizer 340-2 may forward the SYN message and the optimizer information block (including the information added by optimizer 340-2) toward content provider 360.

Content provider 360 may receive the SYN message and the optimizer information block. Based on receiving this information, content provider 360 may now be "aware" that the functionality of MOC 350 is available (e.g., MOC 350 is available to act as a single optimizer/flow processor, and that optimizers 340-1 and 340-2 may be disabled). MOC 350 may also be made "aware" of the types of optimizers that are in the signal path between user device 305 and content provider 360 (e.g., the optimizer information block may, in some implementations, include information identifying the type of a particular optimizer and/or a descriptor of its function).

Content provider 360 may select (at 745) which optimizers, if any, are to perform optimization and/or flow processing on traffic sent between user device 305 and content provider 360. For example, content provider 360 may determine that MOC 350 should perform optimization/flow processing, while optimizers 340-1 and 340-2 should pass through traffic without performing any sort of flow processing or optimization. As another example, content provider 360 may determine that MOC 350 and optimizer 340-1 should perform optimization and/or flow processing, while optimizer 340-2 should pass through traffic without performing any sort of flow processing or optimization. In some implementations, MOC 350 may have multiple types of optimization and/or flow processing capabilities, and content provider 360 may select which of the available optimization and/or flow processing techniques should be used by MOC 350 when processing traffic associated with content provider 360.

When selecting the optimizer(s), content provider 360 may generate an optimizer selection block, an example of which is shown in FIG. 10. For example, optimizer selection block 1000, shown in FIG. 10, may include information similar, or identical to, the information included in optimizer information block 800. In addition, optimizer selection block 1000 may include an enable/disable field, which may indicate, for a particular optimizer, whether the particular optimizer should perform optimization/flow processing or not. For example, a value of "1" may indicate that the particular optimizer is enabled (e.g., should perform optimization/flow processing), while a value of "0" may indicate that the particular optimizer is disabled (e.g., should pass through traffic associated with content provider 360). While not explicitly shown in this example, optimizer selection block 1000 may, in some implementations, include information indicating type(s) of optimization/flow processing that a particular optimizer should perform.

Returning to FIG. 7, content provider 360 my output (at 750) a response to the SYN message (e.g., a TCP SYN-ACK message), along with a selection of one or more optimizers (e.g., along with optimizer selection block 1000). Assume, in this example, that content provider 360 has selected MOC 350 to perform optimization and/or flow processing functions, and has further selected that optimizers 340-1 and 340-2 should simply pass through traffic associated between user device 305 and content provider 360. Optimizer 340-2 may receive the SYN-ACK message and the optimizer selection information, and may perform (at 755) a configuration based on the optimizer selection information. For example, optimizer 340-2 may store an indication that traffic between user device 305 and content provider 360 should be passed through, in lieu of optimizer 340-2 performing its optimization and/or flow processing functions on the traffic.

Optimizer 340-2 may forward (at 760) the SYN-ACK message and the optimizer selection information toward user device 305. Optimizer 340-1 may also receive the SYN-ACK message and the optimizer selection information, may perform (at 765) a configuration based on the optimizer selection information, and may forward (at 770) the SYN-ACK message and the optimizer selection information towards user device 305.

MOC 350 may receive the SYN-ACK message and the optimizer selection, and may perform (at 775) a configuration based on the optimizer selection information. For example, since MOC 350 was selected, by content provider 360, to perform optimization and/or flow processing on traffic between user device 305 and content provider 360, MOC 350 may store an indication that such optimization and/or flow processing should be performed. MOC 350 may forward (at 780) the SYN-ACK message (e.g., without sending the optimizer selection information) to user device 305. In accordance with TCP handshake protocols, user device 305 may output (at 785) an acknowledgement ("ACK") message to content provider 360.

Once the handshake has been performed (i.e., SYN, SYN-ACK, and ACK) traffic may flow (at 790) between user device 305 and content provider 360. As shown, MOC 350 may perform optimization and/or flow processing on the traffic, while optimizers 340-1 and 340-2 may pass the traffic through, without performing optimization and/or flow processing. As mentioned above, the optimization and/or flow processing, performed by MOC 350, may be any type of optimization and/or flow processing. In some implementations, the optimization and/or flow processing, performed by MOC 350, may be based on information received from base station 310, such as metrics relating to a RAN associated with base station 310 (e.g., a quantity of devices attached to the RAN, an amount of bandwidth available via the RAN, an amount of used and/or free resources associated with base station 310, etc.).

While FIG. 7 illustrates an implementation in which optimizers are selected by content provider 360, FIG. 11 illustrates an example signal flow in which optimizers are selected by MOC 350. Signals 1105-1140 are similar to signals 705-740, discussed above with respect to FIG. 7, and will not be described again, for the sake of brevity.

Content provider 360 may output (at 1145), a SYN-ACK message, as well as the optimizer information block received at 1140, to MOC 350. The optimizer information block may include information regarding MOC 350, optimizer 340-1, and optimizer 340-2. In some implementations, the optimizer information block may not include information regarding MOC 350 (e.g., MOC 350 may not have included information regarding itself in the optimizer information block, at 1115).

MOC 350 may forward (at 1150) the SYN-ACK message to user device 305, which may respond (at 1155) with an ACK message). MOC 350 may select (at 1160) one or more optimizers for traffic flows between user device 305 and content provider 360. In some implementations, MOC 350 may generate an optimizer selection block (e.g., similar to optimizer selection block 1000). For example, MOC 350 may use the optimizer information block to determine which optimizers are on the signal path between user device 305 and content provider 360 and may make a selection based on SLAs, network load, and/or other factors.

MOC 350 may forward (at 1165) the ACK message and the optimizer selection block toward content provider 360. Optimizers 340-1 and 340-2 may receive the ACK message and the optimizer selection block, may perform a configuration based on the optimizer selection block, and may forward the ACK message and the optimizer selection block toward content provider 360 (at 1165-1185). Once content provider 360 receives the ACK message and the optimizer selection block, the traffic flow between user device 305 and content provider 360 may be established (at 1190), and the selected optimizer(s) (e.g., as selected by MOC 350) may proceed to respectively process and/or pass through the traffic.

FIG. 12 illustrates an example implementation, in which optimizers may be automatically to disable optimization services based on receiving a message from MOC 350 (e.g., in which a "selection," per se, of optimizers need not be performed). As shown, user device 305 may output (at 1205) a SYN message toward content provider 360, and MOC 350 may determine (at 1210) whether to optimize traffic flows between user device 305 and content provider 360. Assuming that MOC 350 is to optimize traffic flows between user device 305 and content provider 360, MOC 350 may generate (at 1215) an optimizer disable instruction. The optimizer disable instruction may include, for example, information indicating the presence of MOC 350, and/or authentication/identification information.

MOC 350 may output (at 1220) the SYN message and the optimizer disable instruction toward content provider 360. The SYN message may be received by optimizer 340-1, and optimizer 340-1 may store an indication that optimizer 340-1 should not perform optimization/flow processing for traffic flows between user device 305 and content provider 360. In some implementations, optimizer 340-1 may check authentication/identification information, in the optimizer disable instruction, in order to verify that the instruction is authentic (e.g., has been sent by MOC 350, and/or that MOC 350 is authorized to disable the optimization functionality of optimizer 340-1).

Optimizer 340-1 may forward (at 1230) the SYN message and the optimizer disable instruction toward content provider 360, and optimizer 340-2 may receive the SYN message and the optimizer disable instruction. Optimizer 340-2 may also disable (at 1235) optimization/flow processing functionality for traffic flows between user device 305 and content provider 360, and may forward (at 1240) the SYN message and the optimizer disable instruction toward content provider 360. Content provider 360 may return (at 1245) a SYN-ACK message to user device 305, which may respond (at 1250) with an ACK message. The traffic flow may be established (at 1260) between user device 305 and content provider 360, with MOC 350 performing optimization/flow processing, and optimizer 340-1 and optimizer 340-2 passing the traffic through.

Figure 13:
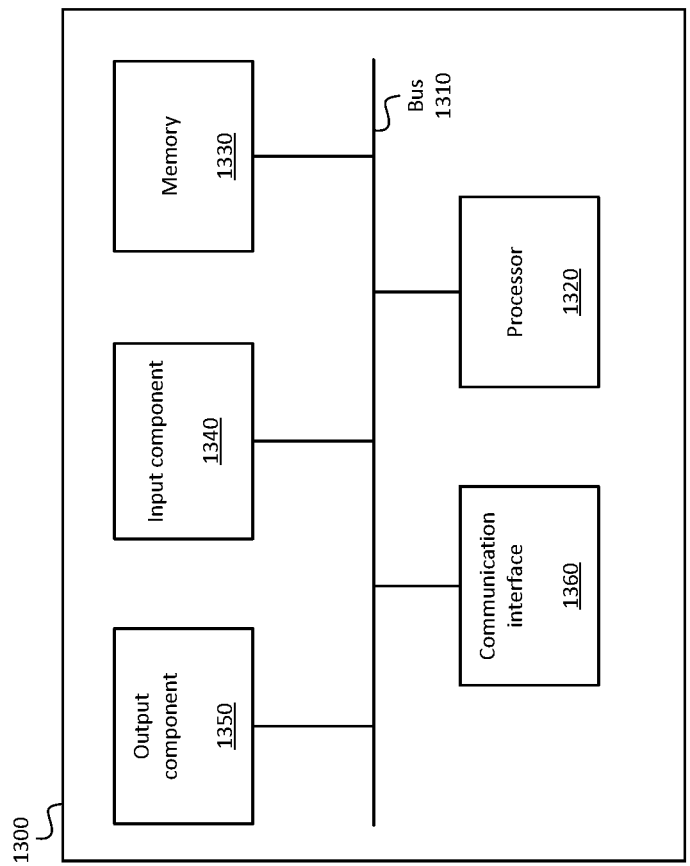
FIG. 13 illustrates example components of a device, in accordance with some implementations described herein.

FIG. 13 is a diagram of example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 4-7, 11, and 12, the order of the blocks and/or signals may be modified in other implementations. Further, non-dependent blocks and/or signals may be performed in parallel. Additionally, while FIGS. 4-7, 11, and 12 have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    a memory device storing a set of processor-executable instructions; and
    a processor configured to execute the processor-executable instructions, wherein executing the processor-executable instructions causes the processor to:
        determine a resource locator associated with a particular content provider;
        identify, based on the resource locator associated with the particular content provider, a traffic flow between a user device and the particular content provider;
        output, based on identifying the traffic flow between the user device and the particular content provider, an optimizer disable instruction that causes any optimizers, in a signal path between the device and the content provider, to pass through traffic associated with the traffic flow, without performing optimization on the traffic.

2. The device of claim 1, wherein executing the processor-executable instructions further causes the processor to:
    perform optimizations on the traffic, associated with the traffic flow.

3. The device of claim 2, wherein executing the processor-executable instructions further causes the processor to:
    receive information relating to one or more performance metrics of a radio access network ("RAN") of a wireless telecommunications network, wherein the optimization is performed based on the one or more performance metrics.

4. The device of claim 1, wherein the device is communicatively coupled to, or is integrated as part of, a base station of a wireless telecommunications network.

5. The device of claim 1, wherein the resource locator, associated with the particular content provider, includes one or more Internet Protocol ("IP") addresses associated with the particular content provider,
    wherein executing the processor-executable instructions, to identify the traffic flow between the user device and the particular content provider, further causes the processor to:
        receive a Transmission Control Protocol ("TCP") synchronize ("SYN") message from the user device;
        compare a destination IP address, associated with the SYN message, to the one or more IP addresses associated with the particular content provider; and
        determine, based on the comparing, that the IP address, associated with the SYN message, matches a particular IP address associated with the particular content provider.

6. The device of claim 1, wherein the optimizer disable instruction, instructing any optimizers, in a signal path between the device and the content provider, to pass through traffic associated with the traffic flow, includes authentication information associated with the device,
    wherein a particular optimizer, in the signal path between the device and the content provider, uses the authentication information to verify that the device is authorized to instruct the particular optimizer to pass through the traffic associated with the traffic flow.

7. The device of claim 1, wherein executing the processor-executable instructions further causes the processor to:
    receive, from the particular content provider, a resource locator that points to a list of Internet Protocol ("IP") addresses associated with the particular content provider, the list being updated in a dynamic fashion; and
    periodically or intermittently obtain the list of IP addresses, using the resource locator that points to the list,
    wherein the resource locator, associated with the content provider, includes a particular IP address, in the list of IP addresses.

8. A method, comprising:
    determining, by a network device, a resource locator associated with a particular content provider;
    identifying, by the network device and based on the resource locator associated with the particular content provider, a traffic flow between a user device and the particular content provider;
    outputting, by the network device and based on identifying the traffic flow between the user device and the particular content provider, an optimizer disable instruction that causes any optimizers, in a signal path between the device and the content provider, to pass through traffic associated with the traffic flow, without performing optimization on the traffic.

9. The method of claim 8, further comprising:
    performing optimizations on the traffic, associated with the traffic flow.

10. The method of claim 9, further comprising:
    receiving information relating to one or more performance metrics of a radio access network ("RAN") of a wireless telecommunications network, wherein the optimization is performed based on the one or more performance metrics.

11. The method of claim 8, wherein the network device is communicatively coupled to, or is integrated as part of, a base station of a wireless telecommunications network.

12. The method of claim 8, wherein the resource locator, associated with the particular content provider, includes one or more Internet Protocol ("IP") addresses associated with the particular content provider,
    wherein identifying the traffic flow between the user device and the particular content provider, includes:
        receiving a Transmission Control Protocol ("TCP") synchronize ("SYN") message from the user device;

comparing a destination IP address, associated with the SYN message, to the one or more IP addresses associated with the particular content provider; and determining, based on the comparing, that the IP address, associated with the SYN message, matches a particular IP address associated with the particular content provider.

13. The method of claim 8, wherein the optimizer disable instruction, instructing any optimizers, in a signal path between the device and the content provider, to pass through traffic associated with the traffic flow, includes authentication information associated with the device, wherein a particular optimizer, in the signal path between the device and the content provider, uses the authentication information to verify that the device is authorized to instruct the particular optimizer to pass through the traffic associated with the traffic flow.

14. The method of claim 8, further comprising:

receiving, from the particular content provider, a resource locator that points to a list of Internet Protocol ("IP") addresses associated with the particular content provider, the list being updated in a dynamic fashion; and periodically or intermittently obtaining the list of IP addresses, using the resource locator that points to the list, wherein the resource locator, associated with the content provider, includes a particular IP address, in the list of IP addresses.

15. A device, comprising:

a memory device storing a set of processor-executable instructions; and a processor configured to execute the processor-executable instructions, wherein executing the processor-executable instructions causes the processor to:

determine a resource locator associated with a particular content provider;

identify, based on the resource locator associated with the particular content provider, a traffic flow between a user device and the particular content provider;

receive identifying information regarding a set of traffic optimizers in a signal path between the device and the particular content provider, the identifying information being included with a Transmission Control Protocol ("TCP") Synchronize ("SYN") message from the user device;

select one or more traffic optimizers, of the set of traffic optimizers, to disable for the traffic flow; and output an optimizer disable instruction that causes the selected one or more traffic optimizer, to pass through traffic associated with the traffic flow, without performing optimization on the traffic.

16. The device of claim 15, wherein executing the processor-executable instructions further causes the processor to:

perform optimization on traffic, associated with the traffic flow.

17. The device of claim 16, wherein executing the processor-executable instructions further causes the processor to:

receive information relating to one or more performance metrics of a radio access network ("RAN") of a wireless telecommunications network, wherein the optimization is performed based on the one or more performance metrics.

18. The device of claim 15, wherein the device is communicatively coupled to, or is integrated as part of, a base station of a wireless telecommunications network.

19. The device of claim 15, wherein the resource locator of the particular content provider includes one or more Internet Protocol ("IP") addresses associated with the particular content provider, wherein executing the processor-executable instructions, to identify the traffic flow between the user device and the particular content provider, further causes the processor to:

compare a destination IP address, associated with the SYN message, to the one or more IP addresses associated with the particular content provider; and determine, based on the comparing, that the IP address, associated with the SYN message, matches a particular IP address associated with the particular content provider.

20. The device of claim 15, wherein the optimizer disable instruction, instructing any optimizers, in a signal path between the device and the content provider, to pass through traffic associated with the traffic flow, includes authentication information associated with the device, wherein a particular traffic optimizer, in the signal path between the device and the content provider, uses the authentication information to verify that the device is authorized to instruct the particular traffic optimizer to pass through the traffic associated with the traffic flow.

* * * * *